United States Patent [19]

Adiletta

[11] Patent Number: 4,626,265
[45] Date of Patent: Dec. 2, 1986

[54] PURIFICATION SYSTEM

[75] Inventor: Joseph G. Adiletta, Thompson, Conn.

[73] Assignee: Pall Corporation, Glen Cove, N.Y.

[21] Appl. No.: 745,508

[22] Filed: Jun. 17, 1985

[51] Int. Cl.⁴ .............................................. B01D 53/02
[52] U.S. Cl. .................................... 55/316; 55/385 A; 55/473; 55/508; 55/DIG. 31; 55/385 G
[58] Field of Search ...................... 55/316, 473, 385 R, 55/385 A, 385 Y, 479, 484, 495, 502, 508, DIG. 31

[56] References Cited

U.S. PATENT DOCUMENTS

| | | |
|---|---|---|
| 296,758 | 4/1884 | Kutsche . |
| 711,188 | 10/1902 | Stone . |
| 930,561 | 8/1906 | Rahe . |
| 994,282 | 6/1911 | Spilsbury . |
| 1,929,246 | 10/1933 | Hechenbleikner . |
| 2,186,501 | 1/1940 | Seligman et al. . |
| 2,453,613 | 11/1948 | Babbitt . |
| 2,480,732 | 8/1949 | Hendrickson . |
| 2,499,949 | 3/1950 | Glanzer et al. . |
| 3,241,678 | 12/1961 | Wrotnowski . |
| 3,242,649 | 3/1961 | Rivers . |
| 3,242,656 | 3/1966 | Murphy, Jr. . |
| 3,330,414 | 7/1967 | Mecky . |
| 3,434,269 | 3/1969 | Hyatt . |
| 3,630,007 | 12/1971 | Neumann . |
| 3,655,060 | 4/1972 | Hagdahl . |
| 3,747,308 | 7/1973 | Versluis et al. . |
| 3,771,661 | 11/1973 | Barnebey . |
| 3,802,168 | 4/1974 | Deckas ................................. 55/473 |
| 3,961,920 | 6/1976 | Gilbert . |
| 3,964,890 | 6/1976 | Bonn . |
| 3,999,969 | 12/1976 | Shuler ................................. 55/508 X |
| 4,045,350 | 8/1977 | Kupf et al. . |
| 4,095,965 | 6/1978 | Neumann et al. . |
| 4,129,429 | 12/1978 | Humbert et al. ...................... 55/484 |
| 4,226,723 | 10/1980 | Purchas . |
| 4,243,536 | 1/1981 | Prolss . |
| 4,344,784 | 8/1982 | Deckas et al. ........................ 55/473 |
| 4,378,983 | 4/1983 | Martin . |
| 4,385,911 | 5/1983 | Popeil et al. ........................ 55/316 |

OTHER PUBLICATIONS

Various specification sheets (i.e., pp. 87, 12 and 13, and pages from a Barnebey Cheney catalog), showing certain air cleaning equipment.

Primary Examiner—Charles Hart
Attorney, Agent, or Firm—Leydig, Voit & Mayer

[57] ABSTRACT

The disclosure describes an electrical purification system for purifying a gas and which comprises a housing having an inlet and an outlet and defining a gas flow path between the inlet and the outlet, an electric blower means mounted to the housing for effecting a flow of gas along the gas flow path, and a self-contained filtering means operatively associated with the housing to communicate with the flow of gas. The blower means includes a stator and a rotor magnetically coupled to each other and further includes a blade means connected to the rotor and disposed within the housing in the gas flow path for forcing the gas along the gas flow path. The self-contained filtering means includes a plurality of inlet cells, each having a surface with at least one inlet aperture and an internal space communicating with the inlet aperture, a plurality of outlet cells, each having a surface with at least one outlet aperture and an internal space communicating with the outlet aperture, and a plurality of generally planar, microporous filter elements for removing particulate contaminants from the gas. The inlet and outlet cells are alternately arranged with at least one filter element disposed between each inlet cell and outlet cell. The filtering means further includes first and second impervious end means and means for sealingly compressing the filter elements, the inlet cells and the outlet cells between the impervious end means whereby the gas flows from the inlet aperture to the outlet aperture through the filter element.

10 Claims, 3 Drawing Figures

PURIFICATION SYSTEM

TECHNICAL FIELD

The present invention relates to a system for purifying a gas. In particular, it relates to a system in which an electric blower forces a flow of gas through a filter arrangement that removes contaminants from the gas.

BACKGROUND ART

There is a growing awareness of the health hazards presented by many common air pollutants. These pollutants include particulate contaminants such as cigarette smoke or pollen and toxic or noxious gaseous contaminants such as carbon monoxide or formaldehyde, which may be released from many home or office insulation materials.

In response to this awareness, many retailers are offering air purification units for use in the home or office. Unfortunately, these units frequently have several undesirable characteristics. For example, they are frequently limited in the amount of air they can purify in a given amount of time. Further, they frequently contain filters which are difficult to access and, therefore, hard to replace or clean.

DISCLOSURE OF THE INVENTION

A general object of the present invention is to provide an improved gas purification system. Specific objects include providing a gas purification system which accomodates a large flow of gas but features a small compact design and which is not only reliable and effective but also extremely easy to service.

According to the present invention, an electrical purification system is provided which comprises a housing having an inlet and an outlet and which defines a gas flow path between the inlet and the outlet, an electric blower mounted to the housing for establishing a flow of gas along the gas flow path, and a self-contained filter arrangement associated with to the housing to communicate with the flow of gas. The blower includes a stator and a rotor magnetically coupled to each other and further includes a blade arrangement connected to the rotor and disposed within the housing in the gas flow path. When the electric blower is energized, the magnetic fields within the stator and the rotor interact with one another, causing the rotor and the blade arrangement connected to the rotor to rotate. The rotating blade arrangement forces the gas along the gas flow path. The self-contained filter arrangement includes a plurality of inlet cells, each having a surface with at least one inlet aperture and an internal space communicating with the inlet aperture, a plurality of outlet cells, each having a surface with at least one outlet aperture and an internal space communicating with the outlet aperture, and a plurality of generally planar, microporous filter elements for removing oontaminants from the gas. The inlet and outlet cells are alternately arranged with at least one filter element disposed between each inlet cell and outlet cell. The filter arrangement further includes first and second impervious end plates and a mechanism for sealingly compressing the filter elements, the inlet cells, and the outlet cells between the impervious end plates. Thus, the gas flows through the inlet apertures in the inlet cells, through the filter elements where the contaminants are removed, and out the outlet apertures of the outlet cells.

BEST MODE FOR CARRYING OUT THE INVENTION

Figure 1:
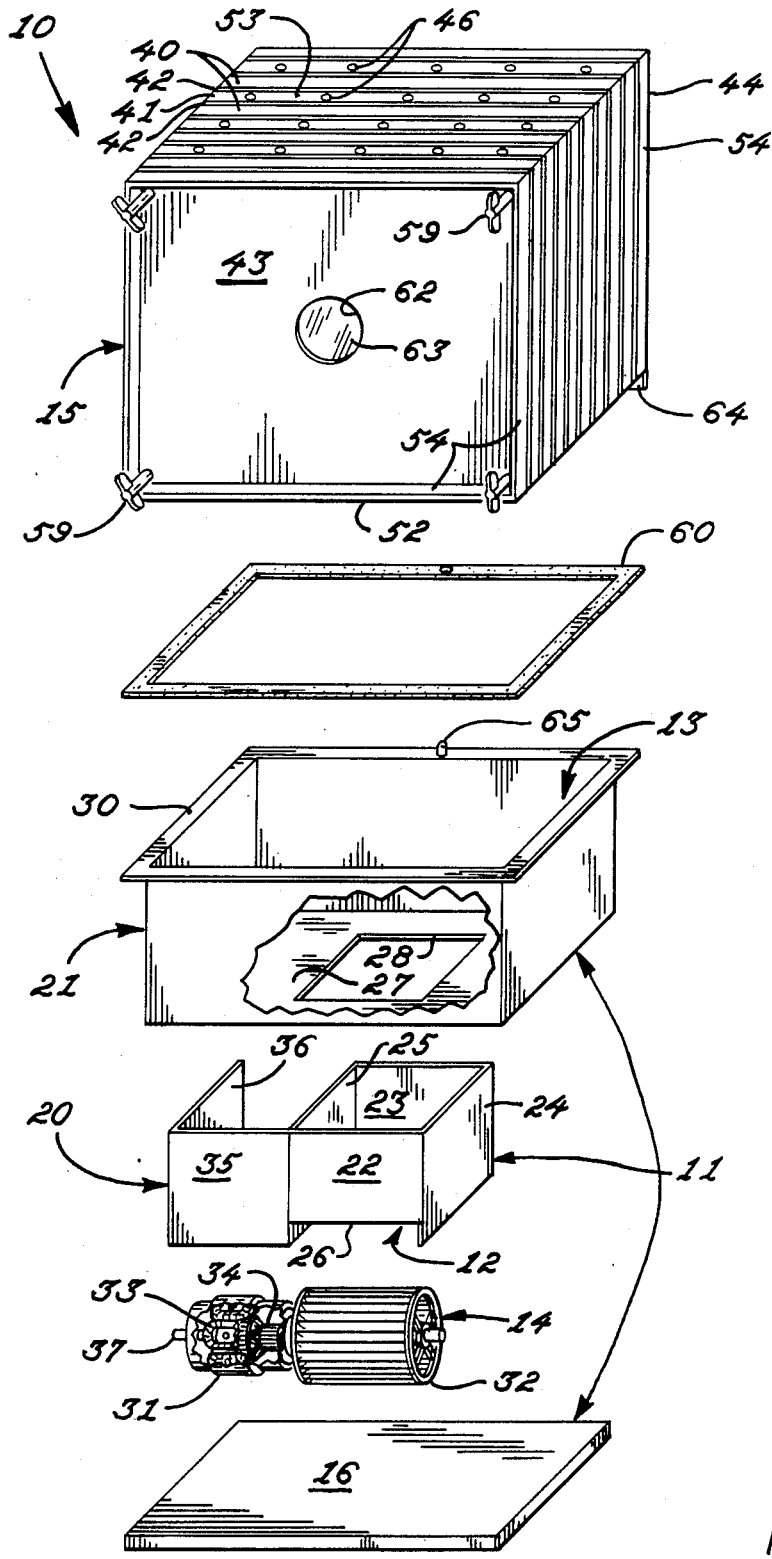
FIG. 1 is an exploded view of an exemplary purification system embodying the invention.

While a purification system constructed and operated in accordance with the invention may be utilized to purify many gases, the exemplary purification system 10 shown in the accompanying FIGS. 1 is described in the context of an air purification system. As shown in FIG. 1, the exemplary purification system 10 generally comprises a housing 11 having an inlet 12 and an outlet 13 and also comprises a blower 14 mounted to the housing 10 for establishing a flow of air from the inlet 12 to the outlet 13. In accordance with one aspect of the invention, the exemplary purification system 10 further comprises a self-contained filter arrangement 15 mounted to the housing 11 in the air flow for removing contaminants from the air.

The housing 11 of the exemplary purification system 10 may be fabricated from metal sheet or other rigid, impervious material and includes a base 16, a blower mount 20 and an upper plenum 21. The base 16 should be sufficiently dimensioned and should be fashioned from a sufficiently heavy material to adequately stabilize the purification system 10. The blower mount 20 is mounted upon the center of the base 16 and comprises front and rear walls 22, 23 extending between opposite end walls 24, 25. The upper surface of the blower mount 20 is open. An aperture 26 in the front wall 22 serves as the inlet 12 to the housing 11.

The upper plenum 21 is generally configured as a rectangular parallelpiped and is centrally mounted atop the blower mount 20. The base 27 of the upper plenum 21 includes an aperture 28 which opens onto and is coincident with the open upper surface of the blower mount 20. The upper surface of the plenum 21 is also open and serves as the outlet 13 of the housing 11. A horizontal flange 30 runs along the upper edge of each wall of the plenum 21.

The blower 14 comprises an electric motor 31, preferably an adjustable speed motor, and a blade arrangement 32, such as a generally cylindrical squirrel cage, coupled to the motor 31. The motor 31, which typically includes a stator 33 magnetically coupled to a rotor 34, is mounted on the exemplary purification system 10 to the outside of one end wall 25 of the blower mount 20 and to two shielding walls 35, 36. However, the blower 14 may be mounted external to or remote from the housing 11 and filter arrangement 15. The blade arrangement 32 is supported between the end walls 24, 25, mounted to each wall 4, 25 by a bearing (not shown). The blade arrangement 22, which is thus free to rotate about its axis, is mechanically coupled to the rotor 34, for example, by means of a shaft 37 extending through a hole in the end wall 25.

Figure 2:
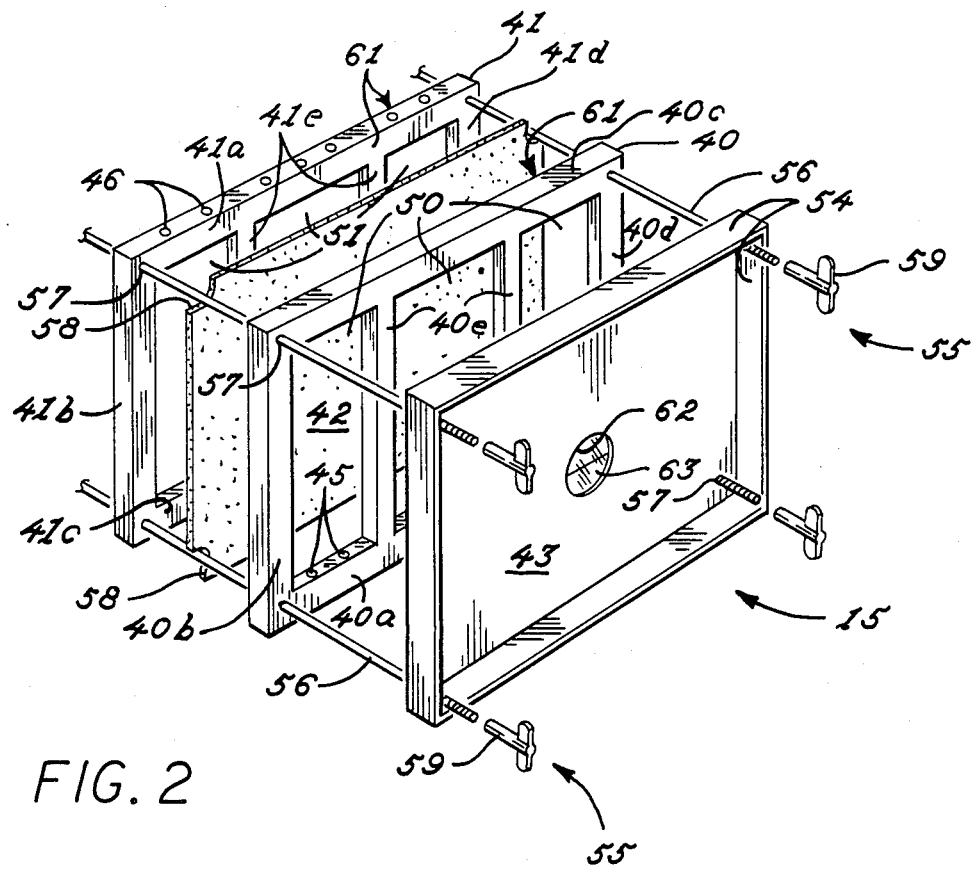
FIG. 2 is an exploded view of a portion of the filter arrangement of FIG. 1.

The self-contained filter arrangement 15 is configured as a rectangular parallelpiped and generally comprises an assembly of inlet cells 40, outlet cells 41, and filter elements 42 compressed between opposite impervious end plates 43, 44, as shown in FIG. 2. The inlet and outlet cells 40, 41, which may be identical to each other, are relatively thin structures. As shown in FIG. 2, each includes four frame members 40a–40d, 41a–41d joined in a rectangular frame and three support members 40e, 41e connected between opposite frame members 40a, 40c, 41a, 41c. However, small cells may not require support members.

In the exemplary purification system 10, which is designated for relatively low flows, the inlet and outlet cells 40, 41 are square and each of the frame members 40a–40d, 41a–41d is about 13½ inches long, about ⅜ inch wide, and about ⅜ inch thick. The support members 40e, 41e are about 3/16 about 3/16 inch thick. Further, both the frame and support members 40a–40e, 41a–41e have square cross-sections, although many different cross-sections may be suitable.

For both the inlet and outlet cells 40, 41, one of the opposite frame members 40a, 41a contains several apertures 45, 46 which interconnect the exterior of the cell 40, 41 and the interior spaces 50, 51 between the frame and support members 40a–40e, 41a–41e. For the exemplary purification system 10, the apertures are about 5/16 inch in diameter and spaced about 23/64 inch from centerline to centerline. For purification systems designed for larger air flows or higher air velocities, thicker cells having larger, rectangular holes with rounded edges may be preferable.

In the preferred embodiment, the inlet and outlet cells 40, 41 are formed by injection molding a thermoplastic material such as polypropylene or polystyrene. Consequently, the frame and support members 40a–40e, 41a–41e are solid and integrally joined to one another. Alternatively, they may be hollow, fashioned from any suitably rigid, impervious material, or joined in any appropriately fixed manner. For example, in high temperature applications, the cells may be fashioned from cast metal with an appropriate geometry for efficient space utilization.

The inlet and outlet cells 40, 41 are distributed alternately within the filter arrangement 15 with the frame and support members 40a–40e of the inlet cells 40 lying opposite the frame and support members 41a–41e of the outlet cells 41, respectively. The inlet and outlet cells 40, 41 are further arranged so all of the inlet apertures 45 and none of the outlet apertures 46 open onto one surface of the filter arrangement 15, defining an inlet surface 52 facing the open upper surface of the upper plenum 21. In the exemplary purification system 10, all of the outlet apertures 46 open onto the opposite surface of the filter arrangement 15, defining an outlet surface 53 facing 180 degrees from the inlet surface 52. Alternatively, the outlet aperatures may open onto either of the adjacent surfaces of the filter arrangement 15, defining an outlet surface facing 90 degrees from the inlet surface 52, or they may open variously onto the opposite surface and the adjacent surfaces.

Disposed between the inlet and outlet cells 40, 41, the filter elements 42 each comprise one or more layers of a microporous filter for removing particulate contaminants, e.g., microbes, dust, smoke, pollen, or aerosol droplets. While a variety of microporous filters are suitable for use in the filter element 42, including microporous membranes or microporous foams, the preferred filter comprises a depthtype, microfibrous medium such as that available from Pallflex Corporation under Style No. A01161. This filter has a high removal efficiency and a high dirt capacity, i.e., an ability to absorb particulates over a substantial lifetime without developing a significantly large pressure drop. Further, the filter preferably has an efficiency rating in excess of 99 percent, i.e., less than 1 percent penetration, as determined by standard tests for removing aerosol particles having an average size of 0.3 microns.

To resist fouling by liquid aerosols, the filter may be treated to be hydrophobic and/or oleophobic, i.e., to resist wetting by water and/or oil-based compositions, respectively. For example, the filter may be treated by a fluoro-chemical treatment similar to that described in Adiletta, U.S. Pat. No. 4,508,775. If the filter element 42 includes a hydrophobic or oleophobic filter, the filtering arrangement 15 may additionally include a drain (not shown) to prevent coalesced liquid from accumulating and obstructing the filter elements 42.

To remove gaseous chemical contaminants, such as toxic or odorous gases, the filter element 42 may also include a sorbent material, i.e., a material which absorbs or adsorbs the chemical contaminant. A variety of sorbent materials is suitable for use in the filter element 42, including, for example, activated carbon, molecular seive, activated alumina or platinum, or mixtures of these materials. Further, the sorbent material may be disposed in a variety of locations in the air flow. In the exemplary purification system 10, particles of the sorbent material may preferably be dispersed within and immobilized by the fibers of the filter medium of the filter element 42. Alternatively, fiber-immobilized sorbent particles or sorbent particles immobilized by a binder and formed in sheets may be disposed away from the microporous filter within the plenum 21, between the plenum 21 and the filter arrangement 15, or adjacent the microfibrous medium of the filter element 42. The sorbent material may even be contained in bulk within the interior space 50, 51 of the inlet or outlet cell 40, 41 with a screen (not shown) preventing the sorbent material from escaping through the inlet or outlet apertures 45, 46.

Where the purification system 10 recirculates the air, the filter arrangement 15 may comprise any combination of filter elements 42 with a sorbent material and filter elements 42 without a sorbent material. Since the filter elements 42 with a sorbent material may be more expensive than those without a sorbent material, decreasing the number of filter elements 42 with a sorbent material decreases the total cost of the filter elements 42. However, it also increases the time to remove the chemical contaminants from the recirculating air.

The impervious end plates 43, 44 are preferably fashioned from rigid metal sheet and have angled edges 54 to provide additional structural integrity. Each end plate 43, 44 is located adjacent an inlet or outlet cell 40, 41, preferably with a gasket or other supplemental sealant disposed between them. To compress the filter elements 42 between the inlet and outlet cells 40, 41 and to provide structural integrity to the self-contained filter arrangement 15, the end plates 43, 44 are disposed on opposite ends of an interconnecting frame assembly 55. While a variety of interconnecting frame assemblies 55 may be suitable, including a spring biased clamping assembly, in the exemplary purification system 10 the interconnecting frame assembly 55 comprises tie rods or carriage bolts 56 running through holes 57 in the corners of the cells 40, 41 and end plates 43, 44 and through cut-outs 58 in the corners of the filter elements 42. Wing nuts 59 are threaded onto the threaded ends of the carriage bolts 56 and may be tightened to provide the desired compression.

In the preferred mode of operation, the rotating blade arrangment 32, which is driven by the motor 31, draws air into the inlet 12, forcing the air into the upper plenum 21 through the aperture 28 in the plenum base 27 and then into the self-contained filter arrangement 15 through the inlet surface 52. In accordance with one aspect of the invention, the upper plenum 21 serves as a flow distribution chamber, providing even, balanced parallel or laminar flow into each of the inlet apertures 45 in the inlet surface 52. Evenly distributing the flow more evenly loads the filter elements 42 and, therefore, allows less frequent replacement or cleaning of the filter elements 42. For example, an upper plenum about 13 inches long, about 4.5 inches wide, and about 6 inches deep is expected to adequately distribute a 50 CFM flow from a central aperture about 5 inches long and 1.5 inches wide in the base of the plenum.

A gasket 60 is disposed between the horizontal flanges 30 of the upper plenum 21 and the filter arrangement 15 to prevent leakage of the air from between them. The gasket 60, which is preferably formed from closed-cell polyurethane, also dampens vibrations and noise caused by the motor 31 and rotating blade arrangement 32. Thus, the self-contained filter arrangement 15 sits noiselessly and securely on the horizontal flanges 30 without the necessity of being fixedly attached to the upper plenum 21. However, if the purification system 10 is moved frequently, it may be preferable to fixedly secure the filter arrangement 15 to the horizontal flanges 30, for example, by clamping or bolting them together.

From the inlet apertures 45, the air flows generally parallel to the adjacent filter elements 42 into the interior spaces 50 of the inlet cells 40. It then changes direction and passes through either of the adjacent filter elements 42 where particulate contaminants or, if the filter element 42 includes a sorbent material, both particulate and chemical contaminants are removed. The filter elements 42 may also include a substance which adds a desirable fragrance to the air. After passing through the filter elements 42, the purified air flows into the interior spaces 51 of the outlet cells 41 and again changes direction, flowing generally parallel to the adjacent filter elements 42 through the outlet apertures 46.

With the air flowing generally parallel to the filter elements 42, the filter arrangement 15 may include a large number of filter elements 42, and, therefore, present a large filtering area, in a relatively small space. The filtering area may be even further increased if the opposite frame members 40a, 40c, 41a, 41c of each inlet and outlet cell 40, 41 have different widths, the opposite frame member 40a, 41a containing the apertures 45, 46 being wider than the other opposite frame member 40c, 41c. The remaining frame members 40b, 40d, 41b, 41d and the support members 40e would then taper between these opposite frame members 40a, 40c, 41a, 41c. This tapered design of the cells 40, 41 would allow an even greater number of filter elements 42 to be included within a filter arrangement 15 of a given volume. Thus, the exemplary purification system 10 can accomodate a greater flow than many conventional room air purifiers and still feature a compact design. Typical flows range from about 25 CFM to about 200 CFM and may be adjusted to suit prevailing conditions within the room or office by adjusting the speed of the motor 31.

In accordance with another aspect of the invention, no gaskets or supplemental sealants are required between the filter elements 42 and the inlet or outlet cells 40, 41. The surface of at least one frame member 40a–40d, 41a–41d adjacent a filter element 42, and preferably both, is wide enough and may even be fluted to provide a sufficiently large contact area 61. Thus, when the assembly of cells 40, 41 and filter elements 42 is compressed by tightening the wing nuts 59 onto the carriage bolts 56, leakage of air between the frame members 40a–40d, 41a–41d and filter elements 42 is prevented.

Not only is the self-contained filter arrangement 15 extremely reliable and effective, it is also extremely easy to service. At least one of the end plates 43, 44 contains a central aperture 62 covered and sealed by a transparent material 63, such as polycarbonate, which allows an end filter element 42 to be viewed through the interior spaces 50, 51 of the inlet or outlet cell 40, 41 adjacent the end plate 43, 44. If the filter element 42 appears dirty, then it and the remainder of the filter elements 42 may be removed and cleaned or replaced simply by lifting the filter arrangement 15 from the horizontal flanges 30, placing it on a horizontal surface such as a table or the floor, and then loosening the wing nuts 59 on the carriage bolts 56. Since each filter element 42 typically comprises a flexible medium and since the corners of the filter element 42 have cutouts 58 rather than holes, the wing nuts 59 need not be entirely removed. They can simply be loosened, allowing each of the inlet cells 40 to be separated from each of the outlet cells 41.

Figure 3:
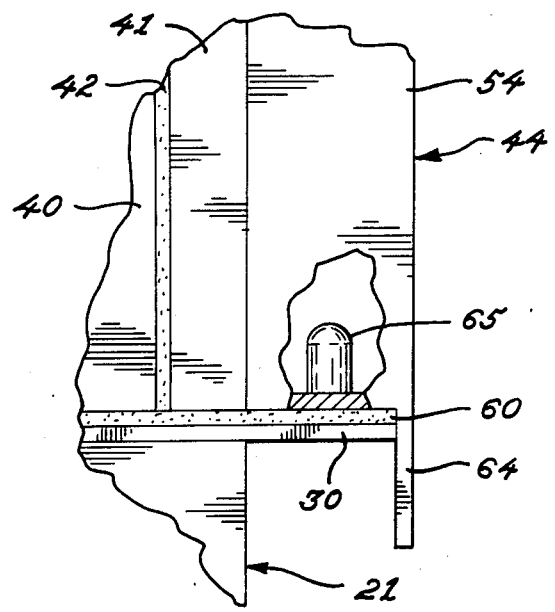
FIG. 3 is a side elevation view of a portion of the filter arrangement and the housing of FIG. 1 showing the filter arrangement sitting on the housing

Once the inlet and outlet cells 40, 41 have been separated, the flexible filter elements 42 may simply be pulled from between them. The dirty filter elements 42 may then be cleaned and returned or replaced by new filter elements 42 simply by inserting the clean or new filter elements between each of the inlet and outlet cells 40, 41. Removing and reinserting filter elements 42 is particularly easy since no gaskets or supplemental sealants are required between the filter elements 42 and the cells 40, 41. The wing nuts 59 are then tightened onto the carriage bolts 56 until the filter elements 42 are again adequately compressed against the inlet and outlet cells 40, 41. The self-contained filter arrangement 15 is then returned to the horizontal flanges 30 with the inlet surface 52 facing the upper plenum 21. As shown in FIG. 3, the filter arrangement 15 is properly located on the upper plenum 21 by a down-turned flange 64 on the angled edge 53 of one of the end plates 43 and by an alignment pin 65 on one of the horizontal flanges 30 of the upper plenum 21. The down-turned flange 64 abuts the horizontal flange 30 on the upper plenum 21 while the alignment pin 65 extends through a corresponding alignment hole in the angled edge 53.

While an exemplary purification system 10 embodying the invention has been previously described, the invention is not limited to that embodiment. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

We claim:

1. An electrical purification system for purifying gas comprising a housing having an inlet and an outlet and defining a gas flow path between the inlet and the outlet; electric blower means mounted to the housing for effecting a flow of gas along the gas flow path, said blower means including a stator and a rotor magnetically coupled to each other and further including a blade means connected to the rotor and disposed within the housing in the gas flow path for forcing the gas along the gas flow path; and a selfcontained filtering means operatively associated with the housing to communicate with the flow of gas, said filtering means including a plurality of inlet cells, each having a surface with at least one inlet aperture and an internal space communicating with the inlet aperture, a plurality of outlet cells, each having a surface with at least one outlet aperture and an internal space communicating with the outlet aperture, and a plurality of generally planar, microporous filter elements for removing particulate contaminants from the gas, said inlet and outlet cells being alternately arranged with at least one filter element disposed between each inlet cell and outlet cell, said filtering means further including first and second impervious end means and means for sealingly compressing the filter elements, the inlet cells and the outlet cells between the impervious end means whereby the gas flows from the inlet aperture to the outlet aperture through the filter element.

2. The electrical purification system of claim 1 wherein all inlet or outlet apertures open onto a first surface of the filtering means and wherein the housing includes a plenum means disposed adjacent the first surface for evenly distributing the flow of gas through the cells.

3. The electrical purification system of claim 2 wherein the plenum means contains an inlet aperture and includes wall means defining an open upper surface, said open upper surface being larger than the inlet aperture and comprising the outlet of the housing, and further including flange means extending horizontally from the wall means at the open upper surface and wherein the filtering means is mounted atop the flange means with the first surface of the filtering means facing the open upper surface of the plenum means.

4. The electrical purification system of claim 3 wherein the plenum means includes an alignment pin extending upwardly from the flange means and wherein the filtering means includes a horizontally extending edge means containing an alignment aperture, said filtering means being mounted atop the flange means with the alignment pin extending through the alignment aperture.

5. The electrical purification system of claim 1 wherein at least one of the filter elements includes a sorbent material for sorbing gaseous contaminants from the gas.

6. The electrical purification system of claim 1 wherein one of the filter elements comprises a microfibrous filter medium.

7. The electrical purification system of claim 6 wherein the filter element includes sorbent particles dispersed within and immobilized by the microfibrous filter medium.

8. The electrical purification system of claim 1 wherein the end means comprises at least one impervious end plate containing an aperture and a transparent material sealingly covering the aperture whereby at least one filter element may be viewed therethrough.

9. The electrical purification system of claim 1 wherein the end means includes opposite end plates with corresponding holes, wherein the inlet and outlet cells are generally rectangular and include holes in at least one corner, wherein the filter elements are generally rectangular and include cut-outs in at least one corner, and wherein the compressing means includes rod means extending through the holes in the end plates, inlet cell, and outlet cells and through the cut-outs in the filter elements and further includes connector means attached to the rod means for providing the desired compression.

10. The electrical purification system of claim 1 further comprising a sorbent means disposed in the flow of gas for sorbing gaseous contaminants from the gas.

* * * * *